United States Patent
Steele et al.

(10) Patent No.: US 7,421,047 B2
(45) Date of Patent: *Sep. 2, 2008

(54) SPACETIME EQUALIZATION IN A WIRELESS RECEIVER

(75) Inventors: Gregory Steele, Fremont, CA (US); Richard D.J. van Nee, De Meern (NL)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/469,396

(22) Filed: Aug. 31, 2006

(65) Prior Publication Data

US 2007/0002983 A1  Jan. 4, 2007

Related U.S. Application Data

(63) Continuation of application No. 10/643,155, filed on Aug. 18, 2003, now Pat. No. 7,127,013.

(51) Int. Cl.
  *H04L 1/02* (2006.01)

(52) U.S. Cl. .................................. 375/347; 375/267
(58) Field of Classification Search ............. 375/150, 375/152, 260, 267, 259, 285, 316, 343, 346–350, 375/148; 370/334; 455/101, 103, 132, 272, 455/278.1

See application file for complete search history.

(56) References Cited

U.S. PATENT DOCUMENTS

| | | | | |
|---|---|---|---|---|
| 6,760,388 B2* | 7/2004 | Ketchum et al. | ............ | 375/295 |
| 7,027,538 B2* | 4/2006 | Ghosh | ............ | 375/350 |
| 7,079,592 B2* | 7/2006 | Chang et al. | ............ | 375/316 |
| 7,130,343 B2* | 10/2006 | Schmidt et al. | ............ | 375/233 |
| 7,149,255 B2* | 12/2006 | Chenu-Tournier et al. | ... | 375/267 |

* cited by examiner

*Primary Examiner*—Khanh C Tran
(74) *Attorney, Agent, or Firm*—Amin, Turocy & Calvin, LLP (57) ABSTRACT

A wireless receiver receives signals at a plurality of antennas and the combined signal is compensated for channel distortion. In other aspects, a wireless receiver includes a minimum distance receiver applied to the output of a whitened-matched filter, which combines channel matched filtering and whitening, using one or more antennas.

22 Claims, 6 Drawing Sheets

SPACETIME EQUALIZATION IN A WIRELESS RECEIVER

CROSS REFERENCES TO RELATED APPLICATIONS

This application is a continuation of U.S. Pat. 7,127,013 B2 (filed as U.S. patent application Ser. No. 10/643,155 on Aug. 18, 2003, which is hereby incorporated by reference, as if set forth in full in this document, for all purposes.

BACKGROUND OF THE INVENTION

Wireless networks have become increasingly popular, as computers and other devices can be coupled for data communications without requiring wired connections between the network nodes. One set of standards for wireless networks is the IEEE 802.11 standards, but other wireless standards or protocols might be used instead. Because wireless networks are expected to operate in unfavorable conditions, such as in the presence of reflections, interference, movement of receivers/transmitters, etc., much effort is needed to correctly transmit and receive data over a wireless channel.

A typical node in a wireless network (referred to in the standards as a "station") includes a receive chain and a transmit chain. A transmit chain typically includes some digital processing and analog, RF circuitry that causes a signal to be transmitted into the wireless channel. A receive chain typically includes one or more antenna, RF and analog circuitry, and digital processing that seeks to output a data stream that represents what the sending transmit chain received as its input and transmitted into the wireless network. In some cases, a receiver uses multiple antennas to improve reception of the signal from a sending transmit chain.

Because of the expected conditions, the receive chain includes various components designed to ensure that signals can be largely recovered correctly. Several techniques have been in use to recover signals.

One technique is the use of a minimum distance receiver (MDR). An MDR uses an estimate of the channel response and knowledge of all of the possible transmitted signals.

The MDR compares a received signal with each of the possible transmitted signals (after the channel response is applied to those possible transmitted signals). Some MDRs might not examine each possible transmitted signal, if they have a mechanism for ignoring clearly unlikely ones of the possible transmitted signals, but generally the complexity of the search relates to the number of possible transmitted signals. A minimum distance receiver gets its name from the idea that a "distance", such as a Euclidean distance, can be calculated between the received signal and a possible transmitted signal adjusted by the channel response. The possible transmitted signal (or signals) that result in the minimum distance is judged to be what was sent. It has been shown that a minimum distance receiver ("MDR") achieves the lowest error probability in the presence of Gaussian noise, which is a widely accepted noise model.

In normal operation of a wireless system, multiple symbols are transmitted through a wireless channel successively. Channel distortion causes the time extent of the symbol to increase, so that energy from one symbol spills into the time window for another symbol, smearing the symbols together. This effect is referred to as inter-symbol interference ("ISI").

In the case in which one isolated symbol is transmitted (so that no ISI is will occur), the MDR selects as the presumed transmitted symbol the symbol that satisfies Equation 1, where r is the received signal, C is the channel response and $\{s_k\}$ is the set of possible transmitted symbols.

$$\min_k \|r - Cs_k\|^2 \quad \text{(Equ. 1)}$$

Of course, symbols are typically not transmitted in isolation. In general, multiple symbols are transmitted in succession, which is referred to herein as a "sequence". A typical sequence in a wireless system might be a complete set of symbols that make up a packet according to protocols used in the wireless channel, but a sequence need not be an entire packet or a single packet. With multiple symbols, inter-symbol interference can be expected. However, the sequence boundaries are typically such that an MDR can assume that there is no inter-sequence interference and the MDR can operate on the sequence.

Thus, where ISI is present, the MDR operates over a sequence rather than being able to deal with single symbols ignoring all other symbols. This means that it might not be sufficient to treat each symbol in isolation, but instead the MDR needs to determine what sequence was sent among all possible sequences. To do so, the MDR finds the sequence of symbols that satisfies a similar condition as in the case where only a single symbol is relevant. An example of such a condition is shown in Equation 2, in which r is the received signal, h is the channel response and $\{p_k\}$ is the set of all possible sequences.

$$\min_{p_k} \|r - h * p_k\|^2 \quad \text{(Equ. 2)}$$

As illustrated by Equation 2, the complexity of the MDR can be expected to grow exponentially with the length of the sequence. Even efficient approaches for implementing the MDR, such as using a Viterbi algorithm, may prove to be too complex to implement, given likely receiver constraints on time, computing power, and power consumption.

In many modulation schemes, the input data is mapped to symbols that comprise multiple signal samples. Examples of this are block codes, in particular, complimentary code keying ("CCK") codes and Barker codes. For example, a CCK symbol comprises eight quadrature phase shift keying ("QPSK") encoded "chips". The channel distortion might smear the boundaries between chips within a symbol. This latter effect is referred to as inter-chip interference ("ICI").

An MDR can operate on a symbol to compensate for ICI, but selecting the symbol among the possible transmitted symbols that minimizes the distance between a group of received samples (e.g., chips) taking into account the estimated channel response due to that symbol. Such an MDR is referred to herein as a Symbol-by-Symbol Minimum Distance Receiver (SbS MDR). For many sequences of symbols, an SbS MDR is easier to implement than an MDR that compares over all possible sequences, however while an SbS MDR compensates for smearing within a symbol, it ignores interference between symbols (ISI).

Another technique for IS compensation is the decision feedback equalizer ("DFE"). With a DFE, the determination of a current symbol being detected takes into account the results of detecting previous symbols. In effect, once it is assumed what the previous symbols were, assumed interference is calculated for those previously detected symbols and is subtracted from the received signal representing the current symbol prior to a symbol decision on the current symbol. Once that interference contribution is subtracted, the remainder is used as the basis for a minimum distance calculation, symbol by symbol.

The energy from interfering symbols that have not yet been determined when a decision is being made on a current symbol is referred to as pre-cursor ISI energy (those undetermined symbols are "behind" the cursor "pointing" to the current symbol being determined). Since a DFE relies on the determination of the previous symbols, it can do well in removing from a current symbol the ISI from those previous symbols, but cannot do well in removing the energy from pre-cursor symbols, as those symbols are not yet known.

Thus, if most of the ISI is from previous symbols, then the DFE removes most of the ISI. Whether the ISI is primarily from the previous symbols depends on which samples are used to make a symbol decision. For finite extent channels, there are always samples that contain little ISI from a given symbol. In general, these samples may also contain little energy from the current symbol, so this presents a trade-off in that the set of signal samples that minimizes ISI from subsequent symbols might not be the most optimal set of signal samples in terms of signal-to-noise ratio ("SNR") for the current symbol determination. This might be due to the set of signal samples having only a small amount of energy contributed for the current symbol.

A DFE works best when the pre-cursor ISI energy is lower. One approach to dealing with ISI is to use an SbS MDR and a DFE applied to the output of a channel matched filter. This combination gives rise to a significant reduction in complexity relative to an MDR that operates sequence-by-sequence, however, it is often the case that this does not provide the highest SNR for the current symbol and lowest amount of pre-cursor ISI energy.

Additional improvements might be needed under adverse conditions.

BRIEF SUMMARY OF THE INVENTION

In one embodiment of a wireless receiver according to the present invention, signals are received at a plurality of antennas and the combined signal is compensated for channel distortion. In other aspects of embodiment of a wireless receiver according to the present invention, the wireless receiver includes a minimum distance receiver applied to the output of a whitened-matched filter, which combines channel matched filtering and whitening, using one or more antennas.

A further understanding of the nature and the advantages of the inventions disclosed herein may be realized by reference to the remaining portions of the specification and the attached drawings.

BRIEF DESCRIPTION OF THE DRAWINGS

FIG. 3A illustrates a single antenna receiver and FIG. 3B illustrates a multiple antenna receiver.

DETAILED DESCRIPTION OF THE INVENTION

Figure 1:
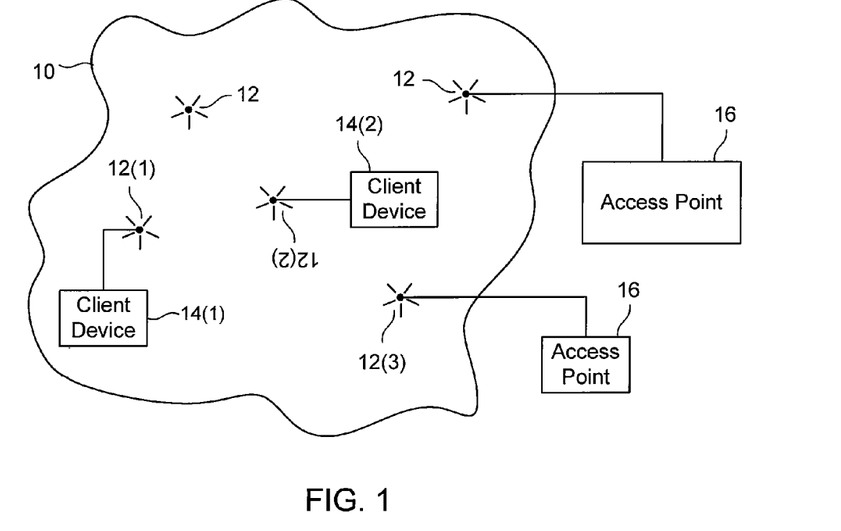
FIG. 1 is a block diagram of a simple wireless network that might use the present invention.

FIG. 1 illustrates a simple wireless network that might use the present invention. As shown in FIG. 1, a wireless network 10 comprises a plurality of stations 12 wherein each station 12 is capable of communicating with at least one other station 12 of wireless network 10. In specific implementations, wireless network 10 is a local area wireless network, as might be used within a building, campus, vehicle or similar environments. In a specific embodiment, wireless network 10 is designed to be compliant with one or more of the IEEE 802.11 standards. However, it should be understood that other standards and nonstandard networks might be substituted therefore to solve problems similar to those solved in the 802.11 environment.

As shown, some of the stations are coupled to client devices 14, while other stations are coupled to access points 16 that interface to distribution systems such as wired local area network (LAN) connections. For example, station 12(1) is coupled to client device 14(1), while station 12(3) is coupled to an access point 16. FIG. 1 is intended to be a simplified and generalized diagram of a wireless network. Interfering signal generators are not shown, but are assumed to be present.

Examples of client devices 14 include laptops, personal digital assistants (PDAs), or any other portable or semi-portable electronic device needing to communicate with other devices, or a stationary electronic device needing to communicate with other devices where a wire connection to a network or the other devices is not available or easily provided. Access points 16 couple their respective stations to a distribution system. Examples of such distribution systems include the Internet, a local area network (LAN) or a public or private connection to a TCP/IP packet network or other packet network or networks.

In a typical operation, a plurality of station devices are outfitted with circuitry and/or software that implements a station 12 functionality and one or more network access points are provided in wireless network 10 to provide access between such a station device and the network to which a wired network interface is coupled. A station coupled to a wired network interface is referred to as an "access point". Just one example of the uses of such a system is to connect computers within a building to a network without requiring network wires to be run to each computer. In that example, the building would be outfitted with stationary access points coupled to the network which are within wireless communication range of wireless network cards in each of the stations coupled to the network.

Figure 2:
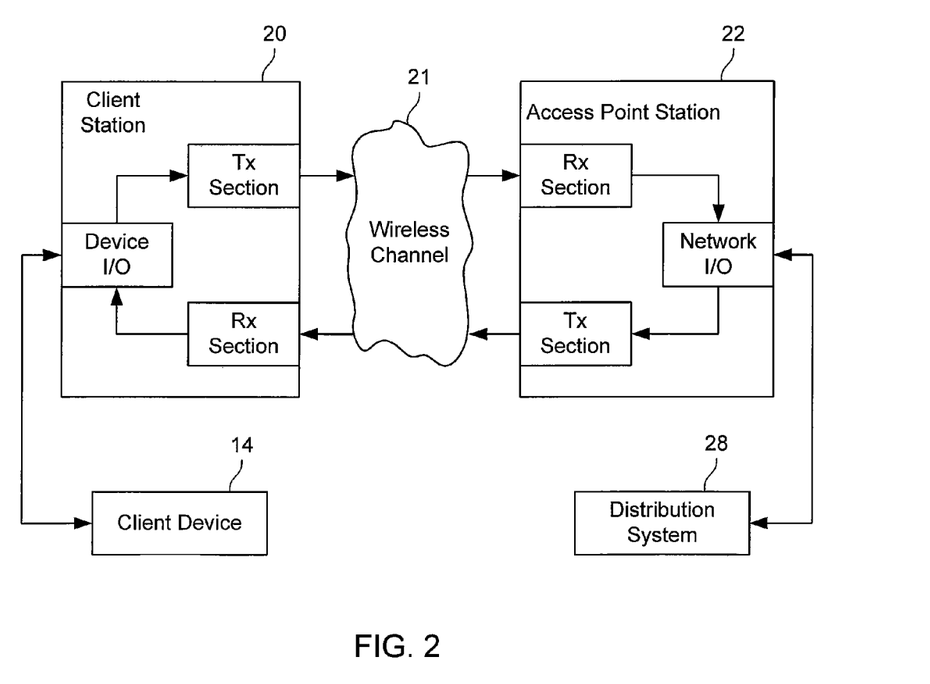
FIG. 2 is a block diagram illustrating the coupling between one basic service station and one access point station of the wireless network shown in FIG. 1.

FIG. 2 shows in more detail the coupling between one device and one network connection. As shown there, client device 14 is coupled to a device I/O section of client station hardware 20. Client station hardware 20 includes a transmit section and a receive section, each coupled to the device I/O section. The transmit section transmits a signal through a wireless channel 21 to a receive section of access point hardware 22. That receive section is coupled to a network I/O section, thus providing a data communication path from client device 14 to a distribution system 28 such as a local area network. A path from distribution system 28 to client device 14 is also provided, via the network I/O section of access point hardware 22, a transmit section of access point hardware 22, a receive section of client station hardware 20 and the device I/O section of client station hardware 20. The characteristics of wireless channel 21 depend on many factors, such as the location of client station hardware 20 and access point hardware 22 as well as intervening objects, such as walls, buildings and natural obstructions, as well as influences by other devices and transmitters and receivers and signal-reflecting surfaces. The stations can be implemented by dedicated hardware, a general purpose processor running station code, or a combination thereof.

Typically, client station hardware 20 can be integrated in with client device 14. For example, where client device 14 is a laptop computer, client station hardware 20 might be an add-on PCMCIA card that is inserted into the laptop's PCMCIA slot. Typically access point hardware 22 is implemented as part of a wired network interface device that is just used to couple a wired network to a wireless network. Notwithstanding the typical implementation, it should be understood that nothing here prevents the diagram of FIG. 2 from being entirely symmetrical, i.e., wherein client station hardware 20 and access point hardware 22 are nearly identical instances of hardware devices, however in many cases, an access point will be fixed and the station that is not an access point is a portable or mobile device where power usage, cost, weight and/or size are considerations.

Figure 3:
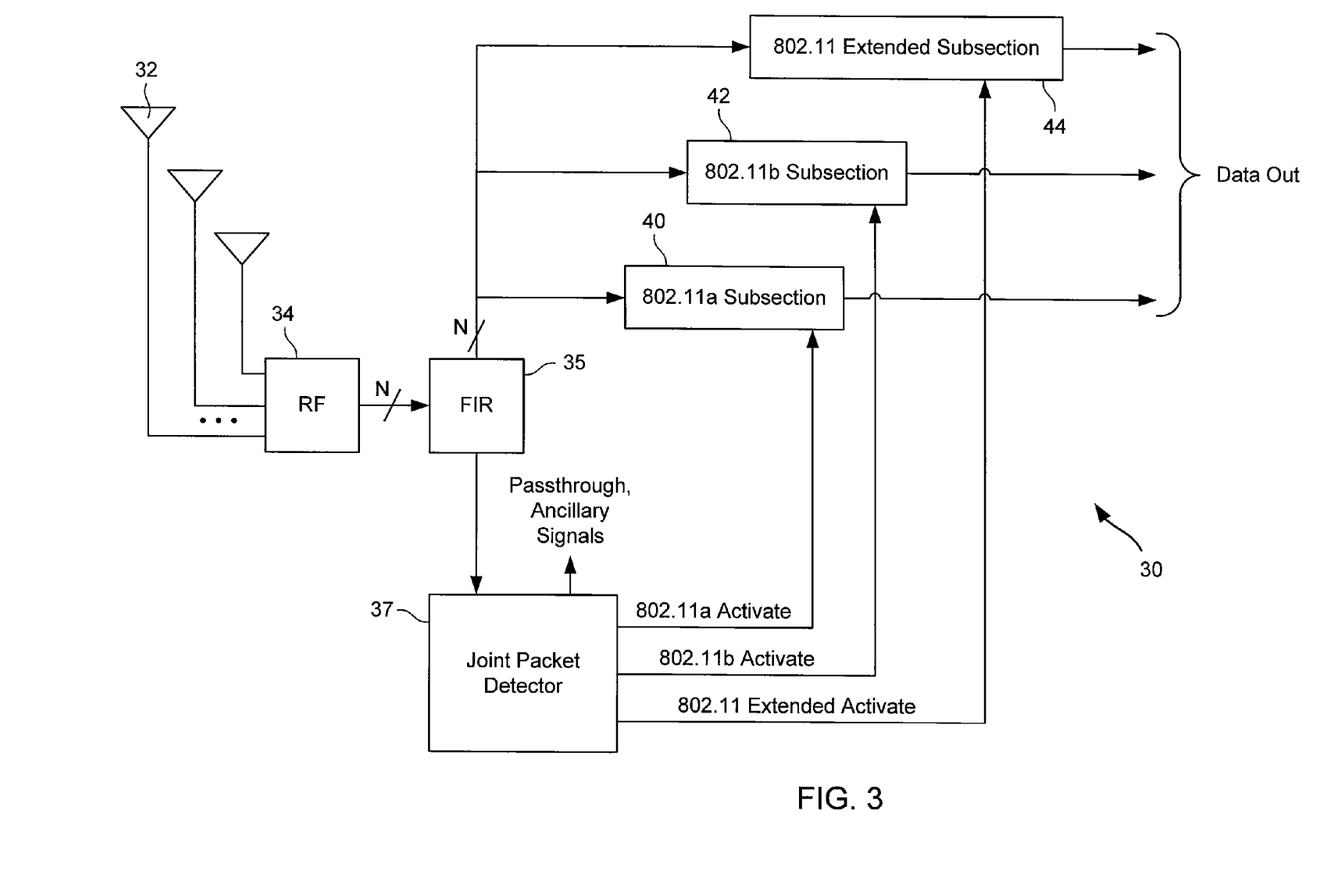
FIG. 3 is a generalized block diagram of a receive section of station hardware as might be used in hardware illustrated in FIG. 2 with improvements according to embodiments of the present invention.

What follows is a detailed description of a receive section. FIG. 3 illustrates components of a receive section. FIG. 3A illustrates a receiver 30 with a single receive antenna, while FIG. 3B illustrates a receiver 40 with multiple receive antennas.

Receiver 30 is shown comprising an RF section 32 that receives a signal from an antenna and provides a baseband digital signal 36 to a digital signal processing ("DSP") section 34, which outputs (data output 38) the receiver's best estimate of the transmitted data that resulted in the received signal. In other variations, the baseband signal is digitized at an input of DSP section 34.

Receiver 40 is shown comprising a plurality of RF sections 42 that receive signals from their respective antennas and provide a baseband signal to single antenna processing sections 44, which then provide their output, typically in digital form, to a multi-antenna processing section 46 that combines the information over multiple antennas to form a data output 48, which is the receiver's best estimate of the transmitted data that resulted in the received signal. Section 46 might include digital signal processing instructions for implementing complimentary code keying ("CCK") and/or Barker demodulation processes. If implemented by digital signal processing, single antenna processing sections 44 and multi-antenna processing section 46 might be implemented by code running on one processor, but where plural processing units or processors are available, some parallel processing might occur. For example, one or more section 44, but less than all, might run on one processor while other processors handle the other sections.

U.S. patent application Ser. No. 10/068,360, filed on Feb. 5, 2002 and entitled "Multi-Antenna Wireless Receiver Chain with Vector Decoding".

Throughout this disclosure, where there are multiple instances of an object and the number of instances is not critical, the instances are numbered from "1" to "n" with the understanding that the value of "n" need not be identical from use to use. For example, "n" is used as the number of antennas in various places, but that number might vary from example to example. It should also be understood that nothing here requires that all instances be used. For example, the receiver illustrated in FIG. 3B might be designed with ten antennas, but only seven of which are being used. This may be for power-saving purposes, because they are not needed when a signal is sufficiently clear, or because the signal levels on the unused antennas are too low to provide a contribution to the detecting process. Thus, "n" might take on different values in different contexts—in the above example, n=10 if all antennas are counted, whereas n=7 if only active antennas are counted. Generally, n>1 for multi-antenna receivers, but it is possible that under some conditions, n=1 (i.e., only one of the n antennas is active), albeit with the attendant loss in information. The number of antennas can be from one to twenty, or more than twenty.

It should be understood throughout this disclosure that the lines shown in the figures could be digital signal lines for communicating a time sequence of complex-valued quantities. It should be further understood that operator objects such as summers might be complex summers. In other cases, the signals communicated might be analog signals, control signals or streams of one or more values.

Overview of Receiver Implementations with Spacetime Equalization

The following disclosure describes the use of multiple receive antennas for mitigating the distortion caused by the frequency selectivity of the wireless channel, but aspects of what is described might be used as well with single receive antenna receivers. In a number of examples, the signals are modulated using Barker and CCK modulation, as these are common and widespread modulations used in wireless systems today, however it should be understood that the teachings of this disclosure are applicable to other existing, and later developed, modulation schemes, unless indicated otherwise.

Using multiple receive antennas for a Barker/CCK receiver with appropriate signal processing can provide increased resistance to frequency-selective channel distortion as compared to single receive antenna systems. A simple example of this is the reduction in effective delay spread that occurs when the receive antennas are processed with a bank of channel matched filters and the results combined. The combined channel/channel matched filter responses combine coherently for the peak correlation value and destructively away from the peak. In the combining process, the channel side lobes are reduced and the channel is effectively shorter. This simple scheme can be used to enhance the performance of single antenna signal processing schemes by acting as a front-end that reduces the delay spread into the rest of the receiver.

Figure 4:
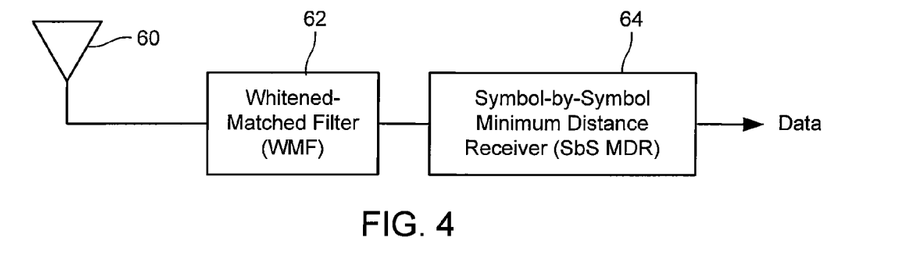
FIG. 4 is a block diagram of a receive section including a whitened-matched filter (WMF) and a symbol-by-symbol minimum distance receiver (SbS MDR).

In an improved receiver according to embodiments of the present invention, a whitened-matched filter is provided in a receiver chain prior to an SbS MDR, as illustrated in FIG. 4. As shown there, a signal might be received by an antenna 60 and provided to a whitened-matched filter ("WMF") 62, possibly via an RF circuit and/or analog-to-digital (A/D) converter, not shown. The output of WMF 62 is provided to an SbS MDR 64, which then outputs the received data. Examples of MDRs that can be modified as described herein are the MDR and variations shown in Kopmeiners.

As SbS MDR 64 operates over symbols, it determines a minimum distance computed over a single symbol, such as a collection of CCK chips that comprise one CCK symbol. It should be noted that, when used as taught herein, the SbS MDR is much more efficient in an implementation than an MDR that operates over a packet or sequence of symbols. In the absence of ISI, the performance would be the same between the SbS MDR and the full MDR, but typically a packet will comprise multiple symbols in quick succession.

By using the WMF, pre-cursor ISI is compensated for, the DFE compensates for post-cursor ISI and the SbS MDR deals with ICI (over the CCK chips, Barker Chips, or the like), as the SbS MDR is applied to the received samples on a symbol-by-symbol basis after the ISI is removed resulting in the benefits of a full MDR, but with much less complexity. Thus, the WMF/DFE combination compensates for the ISI so the input to the SbS MDR should be free of ISI, but may contain ICI. The SbS MDR takes into account the ICI when making symbol decisions.

The coding used can be either Barker coding or CCK coding for 802.11 signaling, or other coding depending on the signaling protocols used. However, in typical cases, Barker coding is robust enough, relative to CCK coding, that multiple antennas, an SbS MDR and a WMF might not be needed to achieve sufficient performance.

Figure 5:
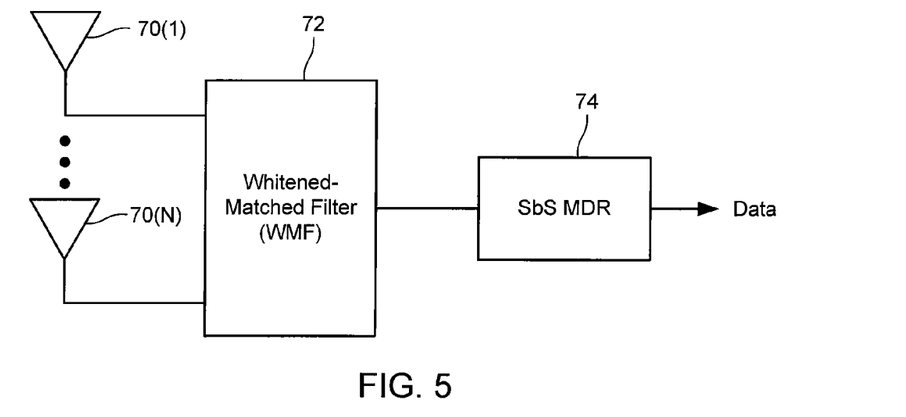
FIG. 5 is a block diagram of a receive section including a whitened-matched filter (WMF) and an SbS MDR with multiple antennas.
Figure 8:
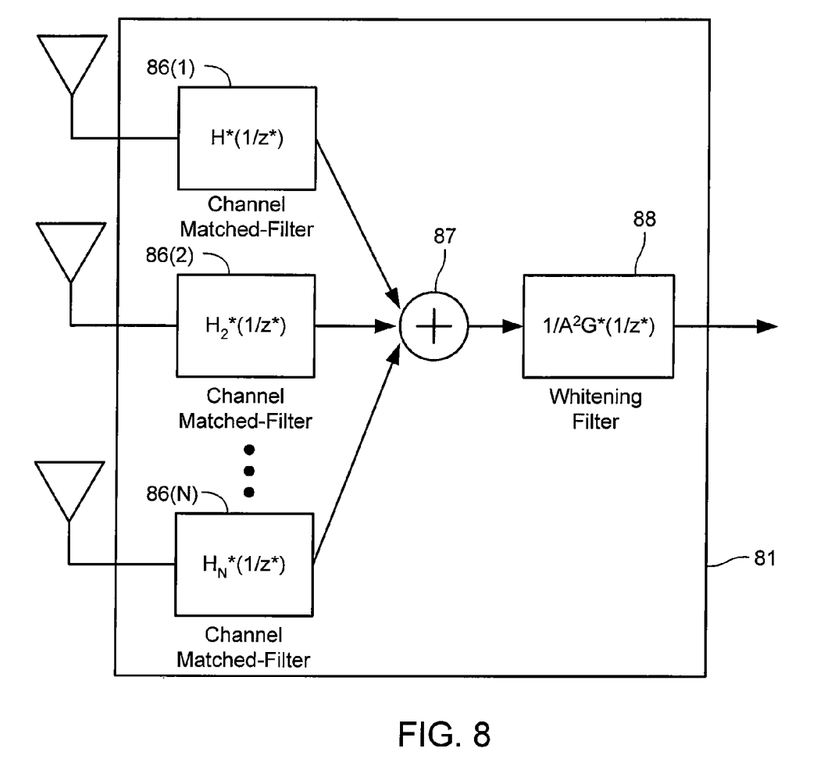
FIG. 8 is a block diagram illustrating another combination of channel matched filters, prior to a summer, and a whitening filter following the summer.

FIG. 5 illustrates a similar improved receiver, having multiple antennas. As shown there, a plurality of signals might be received by antennas 70(1) . . . 70(n) and provided to a whitened-matched filter ("WMF") 72 that combines contributions from the plurality of antennas. The output of WMF 72 is provided to an SbS MDR 74, which then outputs the received data. The output of WMF 72 could be one signal, or one signal per active antenna, or one signal per antenna. An example implementation of WMF 72 with a single signal output is illustrated in FIG. 8, wherein channel matched filters are applied, the channels combined and then a whitening filter applied, where the whitening filter is built using the combined channel response.

Figure 6:
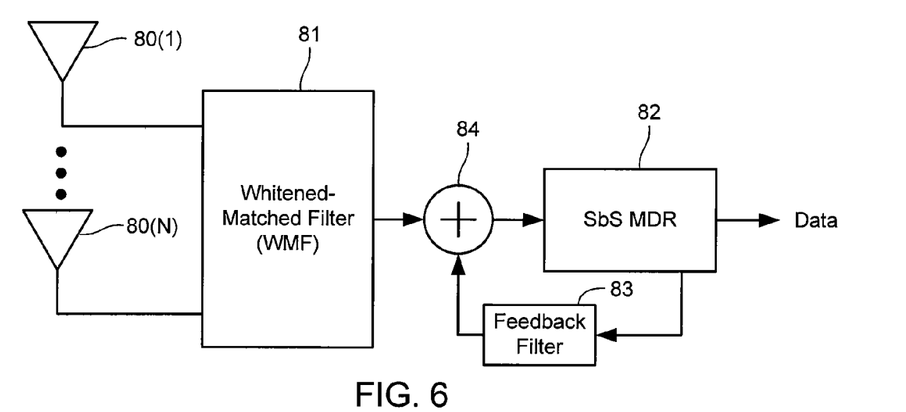
FIG. 6 is a block diagram of a receive section including a whitened-matched filter (WMF), an SbS MDR and a feedback filter, with multiple antennas.

FIG. 6 illustrates an improved receiver having multiple antennas similar to that of FIG. 5, further including feedback. In that receiver, a plurality of signals might be received by antennas 80(1) . . . 80(n) and provided to a whitened-matched filter ("WMF") 81 that combines contributions from the plurality of antennas. The receiver also includes an SbS MDR 82 and a feedback filter 83. The output of feedback filter 83 is combined with the output of WMF 81 by a summer 84. The output of summer 84 forms an input to SbS MDR 82 and SbS MDR 82 provides signals at its one or more output that form the detected data stream and an input to feedback filter 83. Feedback filter 83 together with a decision block, such as a slicer (not shown), in SbS MDR 82 effects a decision feedback equalizer ("DFE").

It should be noted that while a summer 84 is shown as a distinct block, other methods of combining the outputs might be used instead. In a particular embodiment, summer 84 is a complex adder that adds the signals. Of course, in a common implementation, many of the functional blocks are implemented by digital signal processing code and/or hardwired logic. In such implementations, summer 84 might by fully implemented by a single "add" instruction.

Figure 7:
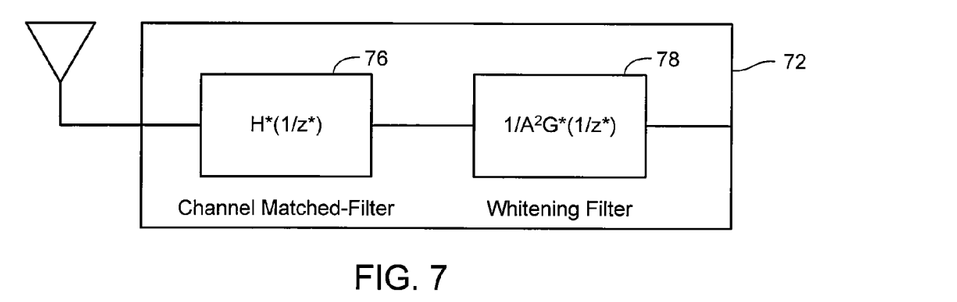
FIG. 7 is a block diagram illustrating one combination of a channel matched filter and a whitening filter.

FIG. 7 is a more detailed block diagram of one implementation of whitened-matched filter ("WMF") 72 shown in FIG. 5, for a single antenna receiver. WMF 72 combines a channel matched filter ("CMF") 76 and a whitening filter ("WF") 78. In embodiments where filters are implemented as instructions for hardwired logic or digital signal processor code, the functions of CMF 76 and WF 78 might be integrated such that they are not distinct objects. CMF 76 might be implemented as $H^*(1/z^*)$ where H(z) is the z-transform of the channel. WF 78 might be implemented to perform the filtering function shown in Equation 4, below.

FIG. 8 is a more detailed block diagram as a counterpart to FIG. 7, but wherein multiple antennas are considered. There, WMF 81 comprises a plurality of channel matched filters 86, whose outputs are combined by a summer 87 that provides its sum output as an input to a whitening filter ("WF") 88. WF 88 might be identical to WF 78, but it might also be different. For example, in the preferred embodiment, WF 88 is designed to be the reciprocal maximum-phase spectral factor of the combined channel response. In embodiments where filters are implemented as instructions for hardwired logic or digital signal processor code, the functions of filters 86, summer 87 and filter 88 might be integrated such that they are not distinct objects.

By applying the feedback to the output of the WMF instead of to the output of the channel, detection is improved. The output of the WMF is a signal that is "minimum-phase", which is a property that ensures that samples used in detecting a symbol that maximize SNR have smearing solely from previous symbols, i.e., little or no pre-cursor energy.

An SbS MDR and a DFE applied to the output of a channel matched filter does not provide the highest SNR and lowest amount of pre-cursor ISI energy (i.e., the energy of ISI contributed by samples transmitted after the sample under consideration). A combination of an SbS MDR with a decision feedback equalizer applied to the output of a whitened-matched filter provides an optimal trade-off between maximizing SNR and minimizing pre-cursor distortion. The "minimum-phase" property of the output of the WMF is a property that squarely addresses the trade-off described above. This might be illustrated by the following equations.

Where H(z) represents the z-transform of the channel, under a mild condition such as the Paley-Wiener criteria, the spectrum of the channel can be factored as shown in Equation 3, such that the component G(z) has all of its poles and zeros inside the unit circle.

$$S_H(z) = A_H^2 G(z) G^*(1/z^*) \qquad \text{(Equ. 3)}$$

A linear system whose poles and zeros are all inside the unit circle is "minimum-phase". By applying a channel matched filter to the receive signal, the combined response of the channel and channel matched filter will have z-transform given by $S_H(z)$ in Equation 3. By then applying a filter with z-transform shown in Equation 4 to the output of the matched filter, the resulting signal will be minimum-phase.

$$\frac{1}{A_H^2 G^*(1/z^*)} \quad \text{(Equ. 4)}$$

The DFE benefits from a minimum-phase signal, as that signal has desirable properties. For example, some samples are used in detecting a symbol and the selection of samples that maximizes the SNR is a selection of samples for which it is expected that any smearing that occurs will be solely from previous symbols, which the DFE attempts to cancel out. Applying a whitened-matched filter and a DFE at the symbol level instead of the chip level improves performance.

A filter with the z-transform shown in Equation 4 is referred to as a whitening filter. Herein, the combined response of a channel matched filter and a whitening filter is referred to as the whitened-matched filter.

Variations of Implementations

Basic Implementation

In a basic implementation of a DFE and WMF described below, both the whitened-matched filter and data decisions are applied to individual chips. For Barker modulated signals and CCK modulated signals, data decisions can be made on groups of chips (i.e., symbols) and there are benefits to considering a group of chips as a whole rather than trying to decide on each chip in isolation.

Consider CCK modulation, for example. A CCK symbol comprises eight chips. If a receiver made hard decisions at the chip level, it would lose the processing gain that comes from the CCK modulation. In order to keep this gain, typically a full eight chips from a symbol need to be processed prior to detection. Consider the output of the whitened-matched filter. With an output collected into sets of 8 samples, the result is a large number of possible symbols for the SbS MDR to select from.

The SbS MDR attempts to minimize a distance value, D, for each collection, $\underline{r}_k$, of receive samples according to an equation such as Equation 5, wherein $\underline{s}_l$ represents one of the possible transmit symbols, $G_k$ represents matrices with rows corresponding to the impulse response of the minimum-phase spectral factor of the channel and the sum is over all possible transmit symbols.

$$D = \left\| \underline{r}_k - \sum_{l \le k} G_{k-l} \underline{s}_l \right\|^2 \quad \text{(Equ. 5)}$$

The computational effort can be reduced by assuming that at any ISI present at the output of the whitened-matched filter is contributed only from the previous symbol. Equation 5 can be then written as shown in Equation 6.

$$D = \| \underline{r}_k - G_1 \underline{s}_{k-1} - G_0 \underline{s}_k \|^2 \quad \text{(Equ. 6)}$$

With a DFE in place, interference from the previous symbol, $G_1 \underline{s}_{k-1}$, is removed, leaving the simplified Equation 7.

$$D = \| \underline{r}_k - G_0 \underline{s}_k \|^2 \quad \text{(Equ. 7)}$$

Equation 7 is one mathematical representation of an SbS MDR. Minimizing D from Equation 7 is equivalent to finding the symbol $\underline{s}$ that maximizes M in Equation 8, where $\underline{s}^T$ and $G_0^{*T}$ are the conjugate transposes of s and $G_0$, respectively.

$$M = \text{Re}\{\underline{s}^T G_0^T \underline{r}_k\} - \frac{1}{2} \| G_0 \underline{s} \|^2 \quad \text{(Equ. 8)}$$

This can be implemented as an additional matched filter and CCK correlator with corrections applied to the correlator output prior to slicing. An example of such an implementation of an SbS MDR is shown in FIG. 9.

Figure 9:
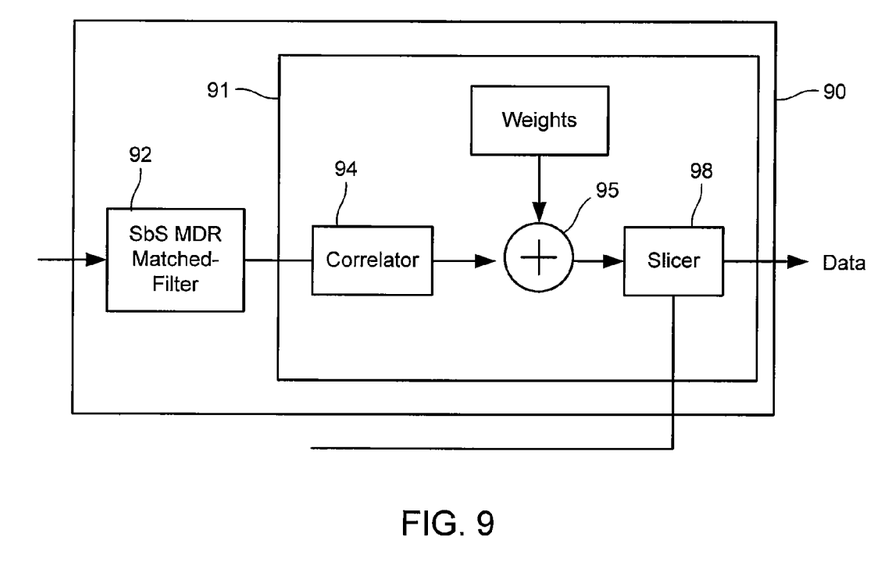
FIG. 9 is a block diagram of one implementation of an SbS MDR.

FIG. 9 shows one example of an SbS MDR 90 (as SbS MDR 82 in FIG. 6, for example) in greater detail, including an SbS MDR matched filter ("SMMF") 92 and a core 91 comprising a correlator 94, a summer 95, correction weights 96 and a slicer 98. SMMF 92 matches SbS MDR 90 to the combined response of the channel and the WMF (not shown here; example: WMF 81 in FIG. 6).

An input to SbS MDR 90 from a summer (not shown), such as summer 84 of FIG. 6, is provided to SMMF 92, the output of which is provided to correlator 94. An output of correlator 94 is summed with correction weights 96 by summer 95, which provides its result to slicer 98. Thus, corrections are applied to the output of correlator 94 prior to slicing. The correction weights correspond to energy in a symbol at the output off the channel, which are preferably subtracted from the correlator output prior to slicing. One implementation for determining suitable correction weights in described below, including one example in Equations 21-22.

Correlator 94 can be a CCK correlator or a Barker correlator or other correlator, depending on the code being used. SMMF 92 can be combined with the WMF and feedback filter to reduce the overall complexity of the implementation. An example of this is shown in FIG. 10.

Figure 10:
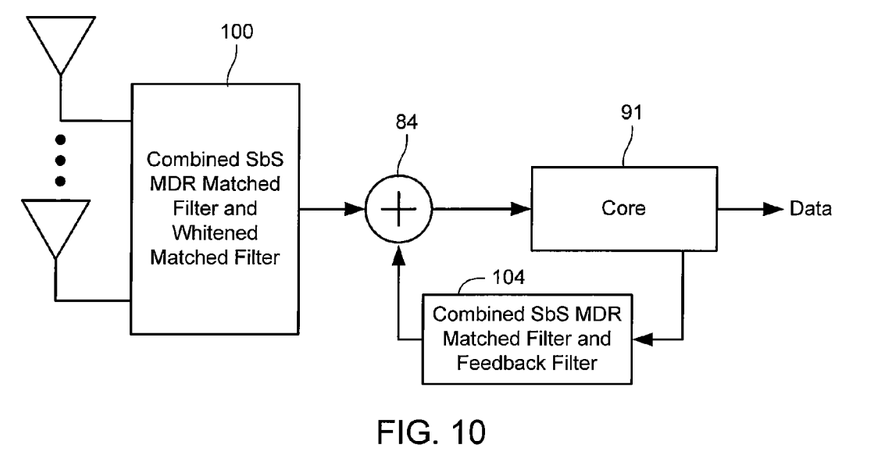
FIG. 10 is a block diagram of a receive section including a first combined filter combining a matched filter and WMF and a second combined filter combining the matched filter and a feedback filter.

As shown in FIG. 10, a filter 100 is a combination of a WMF and the SMMF and the SMMF is also combined with the feedback filter to form a combined filter 104. In one implementation, filter 100 is a combination of SMMF 92, shown in FIG. 9 and described above, with WMF 81 described above in connection with FIG. 7. In one implementation, filter 104 is a combination of SMMF 92 with feedback filter 83 described above in connection with FIG. 6.

The combination of the SbS MDR matched filter and whitening filter is interesting conceptually as well as in terms of implementation. The matrix $G_0^T$ represents truncated versions of the maximum-phase spectral factor of the channel. The transfer function of the whitening filter is the reciprocal of the maximum-phase spectral factor of the channel, so application of $G_0^T$ to the output of the whitening filter gives rise to cancellation in the combined response. The cancellation is cyclo-stationary with regards to the chips in the symbol. That is, the combined response for the first chip in a symbol will be nearly the identity. The combined response for the last chip in a symbol will be the nearly that of the whitening filter. This generates an effect wherein the whitening filter is removing ISI, but not ICI.

Figure 11:
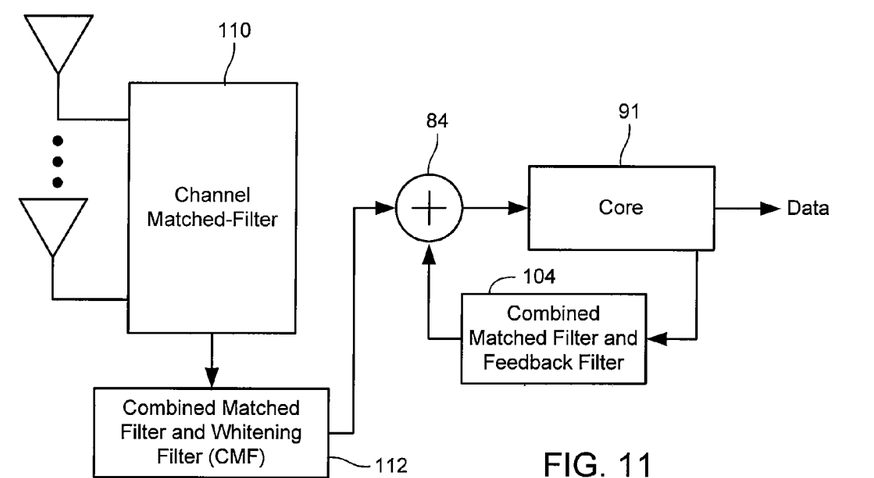
FIG. 11 is a block diagram of a receive section including a distinct channel matched filter, a first combined filter combining a matched filter and a whitening filter and a second combined filter combining the matched filter and a feedback filter.

This approach does require more processing for chips later in a symbol than for the earlier chips. However, since the DFE requires more processing for chips early in the symbol and less for chips later in the symbol, the total amount of processing can be shared for overall even loading. FIG. 11 illustrates an allocation of filter function that takes advantage of this.

As shown in FIG. 11, a CMF 110 receives inputs from antennas and provides results to a combined filter 112 that combines a matched filter (such as SMMF 92 of FIG. 9) and a whitening filter (such as WF 78 in FIG. 7). The results of the combined filter 112 are added to a feedback filter 104 output as described earlier. The feedback filter 104 includes the matched filter as well.

If CMF 110 is implemented such that it is shorter than the channel, the SMMF that is part of combined filter 112 will not comprise the maximum-phase spectral factor of the channel. If CMF 110 is not so implemented, it can still work, but computation of the filter coefficients is a more complex operation.

EXAMPLE

An example implementation will now be described, with reference to various figures, for a given channel. From this example, filter coefficients for feedforward and feedback matched filters (elements 112 and 104 in FIG. 11) for a minimum distance DFE receiver are determined from a given channel characteristic. Consider a channel with z-transform shown in Equation 9. The channel matched filter is for that channel would be as shown in Equation 10.

$$H(z)=1+0.5z^{-1} \qquad \text{(Equ. 9)}$$

$$H^*(1/z^*)=0.5z+1=z(0.5+z^{-1}) \qquad \text{(Equ. 10)}$$

To compute the whitening filter, a Levinson recursion might be used, but other approaches can be used. The autocorrelation of the channel response is as shown in Equation 11. A Levinson recursion solves the system shown in Equation 12 for the forward prediction-error coefficients $\{a_i\}$.

$$R(k) = 1.25, .5, 0, 0, \ldots \qquad \text{(Equ. 11)}$$

$$\begin{pmatrix} R(0) & R(1) & R(2) & \cdots \\ R(1) & R(0) & R(1) & \cdots \\ R(2) & R(1) & R(0) & \cdots \\ \vdots & \vdots & \vdots & \ddots \end{pmatrix} \begin{pmatrix} 1 \\ a_1 \\ a_2 \\ \vdots \end{pmatrix} = \begin{pmatrix} \sigma_e^2 \\ 0 \\ 0 \\ \vdots \end{pmatrix} \qquad \text{(Equ. 12)}$$

A forward prediction-error filter (an intermediate step in building filters shown in the figures) corresponds to the filter with response:

$$\frac{1}{G(z)}. \qquad \text{(Equ. 13)}$$

The filter with coefficients given by the conjugate time reversal of the forward predictions-error coefficients has response:

$$\frac{1}{G^*(1/z^*)}. \qquad \text{(Equ. 14)}$$

By applying the Levinson recursion to the auto-correlation of the channel response and taking the conjugate time reversal of the coefficients, the result is a whitening filter up to a scale factor. The scale factor $A_H^2$ corresponds to the mean-square prediction error and can be obtained from the Levinson recursion. The Levinson recursion recursively generates increasingly better approximations to the whitening filter.

For example, assume the whitening filter is to be a six-tap FIR filter. The first five iterations of the Levinson algorithm give:

$$b_1(z)=1-0.4z^{-1}$$

$$b_2(z)=1-0.48z^{-1}+0.19z^{-2}$$

$$b_3(z)=1-0.49z^{-1}+0.24z^{-2}-0.09z^{-3}$$

$$b_4(z)=1-0.5z^{-1}+0.25z^{-2}-0.12z^{-3}+0.05z^{-4}$$

$$b_5(z)=1-0.5z^{-1}+0.25z^{-2}-0.12z^{-3}+0.06z^{-4}-0.02z^{-5}$$

Here, $A_H^2=1$. In this case, $w(z)=-0.03+0.06z^{-1}-0.12z^{-2}+0.25z^{-3}-0.5z^{-4}-z^{-5}$ would be used as the whitening filter.

Now consider the feedback filter portion of element 104 in FIG. 11 and the SMMF. The coefficients of both filters are obtained from the maximum-phase spectral factor of the channel response. The coefficients of minimum-phase spectral factor $\{g_i\}$ can be obtained from the prediction error filter coefficients through the relationship shown in Equation 15.

$$b(z)g(z)=1 \qquad \text{(Equ. 15)}$$

Thus, $$b_0 g_0 = 1 \Rightarrow g_0 = 1$$

$$b_1 g_0 + b_0 g_1 = 0 \Rightarrow g_1 = -b_1 \Rightarrow g_1 = 0.5$$

$$b_2 g_0 + b_1 g_1 + b_0 g_2 = 0 \Rightarrow g_2 = -b_2 - b_1 g_1 \Rightarrow g_2 = 0$$

$$b_3 g_0 + b_2 g_1 + b_1 g_2 + b_0 g_3 = 0 \Rightarrow g_3 = -b_3 - b_2 g_1 - b_1 g_2 \Rightarrow g_3 = 0$$

etc.

Note that, in this example, the minimum-phase spectral factor of the channel auto-correlation is the channel response. The maximum-phase spectral factor is obtained by conjugating and time reversing the coefficients of the minimum-phase spectral factor.

Matrices, $G_0$ and $G_1$, shown in Equations 16, 17, respectively, represent the portions of a convolution matrix with coefficients given by the minimum-phase spectral factor that operate and the current and previous symbol respectively.

$$G_0 = \begin{pmatrix} 1 & 0 & 0 & 0 & 0 & 0 & 0 & 0 \\ .5 & 1 & 0 & 0 & 0 & 0 & 0 & 0 \\ 0 & .5 & 1 & 0 & 0 & 0 & 0 & 0 \\ 0 & 0 & .5 & 1 & 0 & 0 & 0 & 0 \\ 0 & 0 & 0 & .5 & 1 & 0 & 0 & 0 \\ 0 & 0 & 0 & 0 & .5 & 1 & 0 & 0 \\ 0 & 0 & 0 & 0 & 0 & .5 & 1 & 0 \\ 0 & 0 & 0 & 0 & 0 & 0 & .5 & 1 \end{pmatrix} \qquad \text{(Equ. 16)}$$

$$G_1 = \begin{pmatrix} 0 & 0 & 0 & 0 & 0 & 0 & 0 & .5 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix} \qquad \text{(Equ. 17)}$$

The matrix $G_0^T$ shown in Equation 18 corresponds to the operations of the additional matched filter.

$$G_0^T = \begin{pmatrix} 1 & .5 & 0 & 0 & 0 & 0 & 0 & 0 \\ 0 & 1 & .5 & 0 & 0 & 0 & 0 & 0 \\ 0 & 0 & 1 & .5 & 0 & 0 & 0 & 0 \\ 0 & 0 & 0 & 1 & .5 & 0 & 0 & 0 \\ 0 & 0 & 0 & 0 & 1 & .5 & 0 & 0 \\ 0 & 0 & 0 & 0 & 0 & 1 & .5 & 0 \\ 0 & 0 & 0 & 0 & 0 & 0 & 1 & .5 \\ 0 & 0 & 0 & 0 & 0 & 0 & 0 & 1 \end{pmatrix} \quad \text{(Equ. 18)}$$

Now consider an implementation in which the feedback coefficients $G_1$ and the additional matched filter have been combined. The combined feedback filter is given by $G_0^T G_1$, and $G_0^T G_1 = G_1$ for these sets of values.

The feedback filter operates as follows. When processing the first chip of a symbol, is subtracts off 0.5 the value of the last chip of the previous symbol. In general, the feedback structure will be more complex.

Now consider the combined response of the additional matched filter and whitening filter. Constructing a convolution matrix, W, with rows given by the response of the whitening filter results in the matrix shown in Equation 19 and a combined response given by Equation 20.

$$W = \begin{pmatrix} 1 & -.5 & .25 & -.12 & .06 & -.03 & 0 & 0 & 0 & \cdots \\ 0 & 1 & -.5 & .25 & -.12 & .06 & -.03 & 0 & 0 & \cdots \\ \vdots & \ddots & \ddots & \ddots & \ddots & \ddots & \ddots & \ddots & \ddots & \cdots \\ 0 & 0 & 0 & 0 & 0 & 0 & 1 & -.5 & .25 & \ddots \\ 0 & 0 & 0 & 0 & 0 & 0 & 0 & 1 & -.5 & \ddots \end{pmatrix} \quad \text{(Equ. 19)}$$

$$G_0^T W = \begin{pmatrix} 1 & 0 & 0 & 0 & 0 & 0 & 0 & 0 & \cdots \\ 0 & 1 & 0 & 0 & 0 & 0 & 0 & 0 & \cdots \\ \vdots & \ddots & \ddots & \ddots & \ddots & \ddots & \ddots & \ddots & \cdots \\ 0 & 0 & 0 & 0 & 0 & 1 & 0 & 0 & 0 \\ 0 & 0 & 0 & 0 & 0 & 0 & 1 & -.5 & .25 \end{pmatrix} \quad \text{(Equ. 20)}$$

The combined additional matched filter and whitening filter operate as follows. For the first seven chips of a symbol, the output of the matched filter passes through unchanged. For the last chip of the symbol, use the output of the whitened-matched filter.

The output of the DFE is fed to the CCK correlator. Correction weights are applied to the output of the correlator prior to the making of symbol decisions. These weights correspond to the energy of each symbol at the correlator input. For each symbol $s_k$, compute $\|G_0 s_k\|^2$. Consider the 11 Mbps (megabits per second) CCK symbol $s=\{1,1,1,-1,1,1,-1,1\}$.

$$G_0 s = \begin{pmatrix} 1 \\ 1.5 \\ 1.5 \\ -.5 \\ .5 \\ 1.5 \\ -.5 \\ .5 \end{pmatrix} \quad \text{(Equ. 21)}$$

$$\|G_0 s\|^2 = 1 + 2.25 + 2.25 + .25 + .25 + 2.25 + .25 + .25 = 8.75 \quad \text{(Equ. 22)}$$

A similar weight is computed for each symbol. The corresponding value is subtracted from the correlator output prior to slicing.

Figure 12:
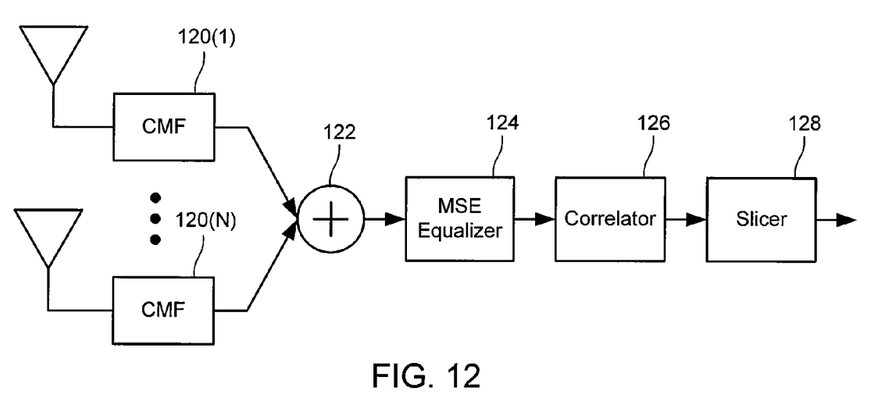
FIG. 12 is a block diagram of a multi-antenna receive section including a mean-square error equalizer, a complimentary code keying ("CCK") correlator and a slicer.

FIG. 12 is a block diagram of a multi-antenna receive section including a plurality of channel matched filters 120, a summer 122, a mean-square error (MSE) equalizer 124, a complimentary code keying ("CCK") correlator 126 and a slicer 128. A similar section might be used for Barker codes.

Figure 13:
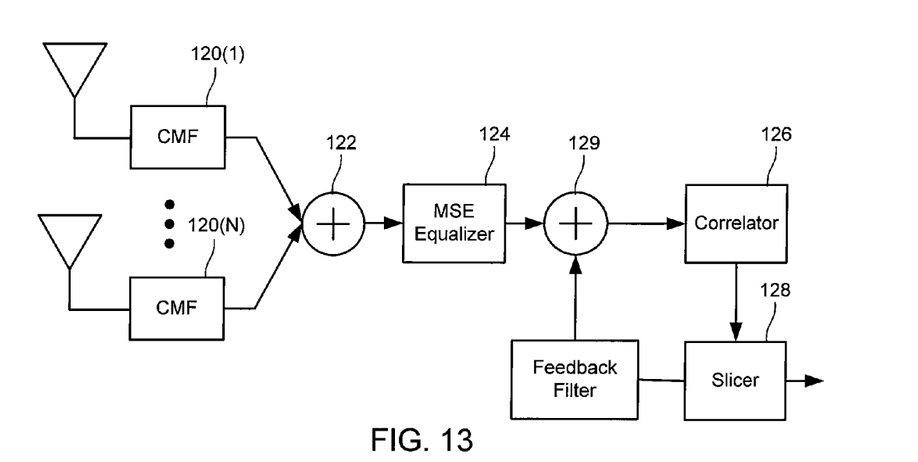
FIG. 13 is a block diagram of a multi-antenna receive section including a mean-square error equalizer, a CCK correlator, a slicer and a feedback filter.

FIG. 13 is a block diagram of a variation of the multi-antenna receive section of FIG. 12. Here, a summer 129 is interposed between MSE equalizer 124 and CCK correlator 126 to add in an output of a feedback filter 130.

Figure 14:
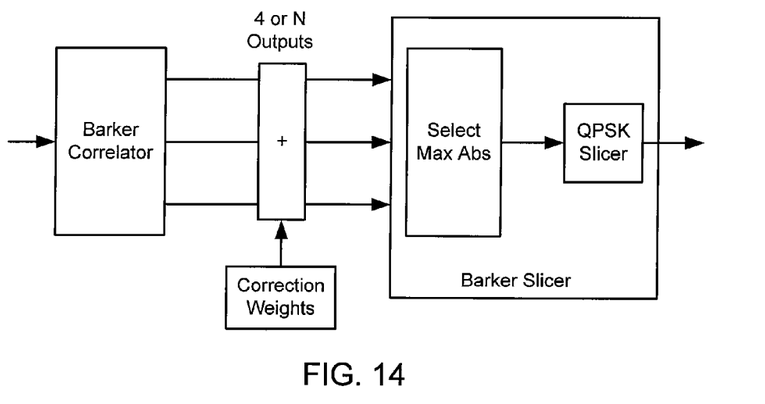
FIG. 14 is a block diagram of an SbS MDR for a Barker demodulator, including a Barker correlator and a Barker slicer.

FIG. 14 is a block diagram of an SbS MDR for a Barker demodulator, including a Barker correlator and a Barker slicer. The number of correction weights for the Barker correlator could be four or some other number.

Figure 15:
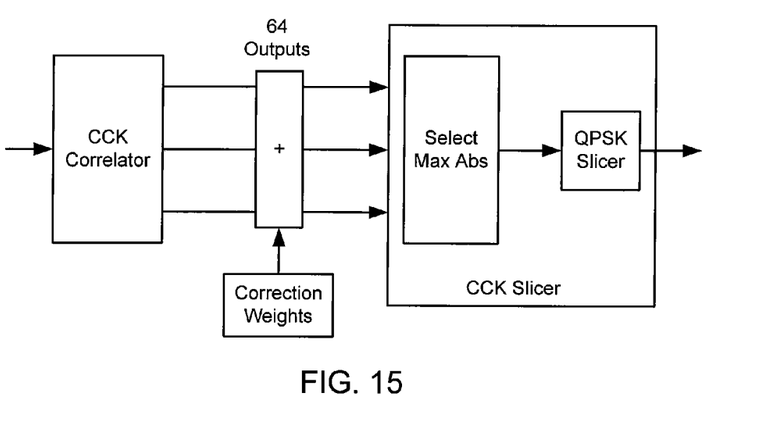
FIG. 15 is a block diagram of an SbS MDR for a CCK demodulator, including a CCK correlator and a CCK slicer.

FIG. 15 is a block diagram of an SbS MDR for a CCK demodulator, including a CCK correlator and a CCK slicer.

Embodiments of the present invention and some variations have now been described. Several embodiments can be used either with a single receive antenna or with multiple receive antennas. As mentioned, the use of multiple receive antennas for combating distortion due to frequency selective channels shortens the effective delay spread and reduces ISI.

A combined filter that combines a whitening filter and an additional matched into one filter gives rise to an efficient computation of filter coefficients as well as an efficient implementation of the filtering operations. In some embodiments, the additional matched filter is a truncated version of the inverse of the whitening filter, for additional efficiency gains.

By combining these filters into one filter, cancellation takes place such that the combined filter compensates for inter-symbol interference ("ISI") but not inter-chip interference ("ICI"). This cancellation gives rise to an implementation that requires fewer operations. There is a relationship (see Equation 15) between the coefficients of the whitening filter and additional matched filter that allows the simple computation of one set of coefficients from the other.

By separating the channel matched filter ("CMF") from the feed-forward and feed-back equalization, the over-all complexity of the receiver is reduced. Where multiple antennas are used, the CMF takes in multiple receive channels and provides a single combined response at one of its outputs. The feed-forward and feed-back equalizers equalize the combined channel response. This separation of processing requires fewer computations than if the receiver tries to equalize each receive chain separately. In addition, the design is more flexible since the equalization/detection portion of the design works the same for any number of receive chains.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A wireless receiver for receiving data over a wireless channel from a plurality of antennas, comprising:
    a whitened matched filter that receives two or more input signals received from the plurality of antennas and outputs a number of filtered signals including at least one combined filtered signal representing a whitened matched filtered signal with contribution from the two or more input signals, wherein the whitened matched filter operates on the two or more input signals according to a channel matched filter and a whitening filter; and a symbol by symbol minimum distance receiver (SbS MDR) that receives the number of filtered signals from the whitened matched filter and outputs a resulting data stream.

2. The wireless receiver of claim 1, wherein the two or more input signals received is different than the number of filtered signals output.

3. The wireless receiver of claim 1, further comprising a Barker demodulator.

4. The wireless receiver of claim 1, further comprising a complimentary code keying demodulator.

5. The wireless receiver of claim 1, further comprising a decision feedback equalizer.

6. A wireless receiver for receiving data over a wireless channel from a plurality of antennas, comprising:
   a whitened matched filter that receives two or more input signals received from the plurality of antennas and outputs a number of filtered signals including at least one combined filtered signal representing a whitened matched filtered signal with contribution from the two or more input signals, wherein the whitened matched filter operates on the two or more input signals according to a channel matched filter and a whitening filter;
   a symbol by symbol minimum distance receiver (SbS MDR) that receives the number of filtered signals from the whitened matched filter and outputs a resulting data stream; and
   an SbS MDR matched filter, matched to a response of the whitened matched filter and the wireless channel, wherein the SbS MDR matched filter and the whitening filter are implemented as a combined filter.

7. The wireless receiver of claim 6, wherein the two or more input signals received is different than the number of filtered signals output.

8. The wireless receiver of claim 6, further comprising a Barker demodulator.

9. The wireless receiver of claim 6, further comprising a complimentary code keying demodulator.

10. The wireless receiver of claim 6, further comprising a decision feedback equalizer.

11. A wireless receiver for receiving data over a wireless channel from a plurality of antennas, comprising:
   a whitened matched filter that receives two or more input signals received from the plurality of antennas and outputs a number of filtered signals including at least one combined filtered signal representing a whitened matched filtered signal with contribution from the two or more input signals, wherein the whitened matched filter operates on the two or more input signals according to a channel matched filter and a whitening filter;
   a symbol by symbol minimum distance receiver (SbS MDR) that receives the number of filtered signals from the whitened matched filter and outputs a resulting data stream; and
   an SbS MDR matched filter, matched to a response of the whitened matched filter and the wireless channel, wherein the SbS MDR matched filter and the feedback filter are implemented as a combined filter.

12. The wireless receiver of claim 11, wherein the two or more input signals received is different than the number of filtered signals output.

13. The wireless receiver of claim 11, further comprising a Barker demodulator.

14. The wireless receiver of claim 11, further comprising a complimentary code keying demodulator.

15. The wireless receiver of claim 11, further comprising a decision feedback equalizer.

16. A wireless receiver for receiving data over a wireless channel from a plurality of antennas, comprising:
   a whitened matched filter that receives two or more input signals received from the plurality of antennas and outputs a number of filtered signals including at least one combined filtered signal representing a whitened matched filtered signal with contribution from the two or more input signals, wherein the whitened matched filter operates on the two or more input signals according to a channel matched filter and a whitening filter;
   a symbol by symbol minimum distance receiver (SbS MDR) that receives the number of filtered signals from the whitened matched filter and outputs a resulting data stream;
   an SbS MDR matched filter, matched to a response of the whitened matched filter and the wireless channel;
   a correlator; and
   a slicer,
   wherein corrections are performed prior to slicing.

17. The wireless receiver of claim 16, comprising a combined filter implementing the SbS MDR matched filter and the whitening filter.

18. The wireless receiver of claim 16, comprising a combined filter implementing the SbS MDR matched filter and a feedback filter.

19. The wireless receiver of claim 16, wherein the two or more input signals received is different than the number of filtered signals output.

20. The wireless receiver of claim 16, further comprising a Barker demodulator.

21. The wireless receiver of claim 16, further comprising a complimentary code keying demodulator.

22. The wireless receiver of claim 16, further comprising a decision feedback equalizer.

* * * * *